(12) United States Patent
Sud

(10) Patent No.: US 7,480,493 B1
(45) Date of Patent: Jan. 20, 2009

(54) BIT DETECTION USING CODE SPECTRUM TRANSFORM TECHNIQUES FOR INTERFERENCE CANCELLATION

(75) Inventor: Seema Sud, Reston, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 603 days.

(21) Appl. No.: 10/976,032

(22) Filed: Oct. 29, 2004

(51) Int. Cl.
H04B 1/02 (2006.01)
(52) U.S. Cl. .................. 455/104; 455/135; 455/134; 455/112; 455/123; 455/103; 370/329; 370/328; 370/320; 370/322
(58) Field of Classification Search .......... 370/479, 370/320, 335, 329, 328, 322; 455/135, 134, 455/112, 108, 123, 103
See application file for complete search history.

(56) References Cited

U.S. PATENT DOCUMENTS

| | | | |
|---|---|---|---|
| 6,161,209 A * | 12/2000 | Moher | 714/780 |
| 6,466,611 B1 * | 10/2002 | Bachu et al. | 375/144 |
| 6,925,127 B1 * | 8/2005 | Dent | 375/260 |
| 6,975,666 B2 * | 12/2005 | Affes et al. | 375/130 |
| 2002/0163896 A1 * | 11/2002 | Hiramatsu | 370/335 |
| 2003/0063557 A1 * | 4/2003 | Mottier | 370/208 |
| 2006/0072485 A1 * | 4/2006 | Cairns et al. | 370/290 |

OTHER PUBLICATIONS

Goldstein, J.; "A Multistage Representation of the Wiener Filter Based on Orthogonal Projections"; *IEEE Transactions on Information Theory*, vol. 44, No. 7, Nov. 1998; 17 pages.

Honig, M. et al.; "Adaptive Reduced-Rank Residual Correlation Algorithms for DS-CDMA Interference Suppression"; *Proceedings from Asilomar*; IEEE; Jul. 1998; 5 pages.

Ricks, D. et al.; "Efficient Architectures for Implementing Adaptive Algorithms"; *Proceedings of the 2000 Antenna Applications Symposium*; Allerton Park, Monitcello, Illinois, Sep. 20-22, 2000; 13 pages.

Sud, S.; "Application of Auto-Regressive Spectrum Estimation to Joint CDMA Code Detection and Interference Cancellation"; *Proceedings of the IEEE International Conference on Acoustics, Speech, and Signal Processing (ICASSP)*; Montreal, Canada, May 17-21, 2004; IEEE, vol. 4; 4 pages.

Sud, S. et al.; "Efficient Interference Cancellation Algorithms for CDMA Utilizing Interference Suppression and Multipath Combining"; *Proceedings of the SCI Multiconference*; Orlando, Florida; Jul. 14-18, 2002; 5 pages.

(Continued)

*Primary Examiner*—Charles N Appiah
*Assistant Examiner*—Kwasi Karikari
(74) *Attorney, Agent, or Firm*—Edell, Shapiro & Finnan, LLC

(57) ABSTRACT

Spreading code detection methods applying autoregressive spectrum estimation (ARSE) techniques to code division multiple access (CDMA) wireless communication systems allowing the subscriber device to estimate the other users' codes. According to one aspect, ARSE techniques are provided using an augmented Wiener-Hopf solution on a received forward link CDMA signal. The ARSE techniques produce a code spectrum transform yielding a power spectral density versus spreading code index relationship from which the spreading codes in the received forward link signal may be identified. According to another aspect, a reduced rank autoregression (AR) implementation is provided to produce a code spectrum transform efficiently with improved false code detection rate. With knowledge of other users' spreading codes, interference cancellation can be performed on the forward link of CDMA systems.

19 Claims, 7 Drawing Sheets

OTHER PUBLICATIONS

Sud, S. et al.; "A Reduced Rank MMSE Receiver for a DS-CDMA System in Frequency Selective Multipath"; *Proceedings of IEEE MILCOM*; McLean, Virginia; Oct. 2001; 5 pages.

Witzgall, H. et al.; "Rocket: A Reduced Order Correlation Kernel Estimation Technique"; *Proceedings of Asilomar*; IEEE 2000; 5 pages.

* cited by examiner

BIT DETECTION USING CODE SPECTRUM TRANSFORM TECHNIQUES FOR INTERFERENCE CANCELLATION

FIELD OF THE INVENTION

The present invention relates to wireless communication systems, and more particularly to techniques for improving the performance of devices that operate according to a code division multiple access (CDMA) technique.

BACKGROUND OF THE INVENTION

Wireless cellular communications systems, e.g., IS-95 in the U.S., use code division multiple access (CDMA) to allow multiple users to share the same bandwidth. CDMA techniques offer many advantages, making them the preferred multiple access techniques for future cellular systems. Nevertheless, designers of these systems must contend with a significant amount of interference due to the non-orthogonal multiplexing of signals that results from the multipath induced by the channel, producing intersymbol interference (ISI).

The CDMA system forward link signal, that is, from base station to subscriber devices, consists of multiple users' signals transmitted synchronously by the base station. In current and near-term future CDMA systems, the subscriber device has knowledge only of its own spreading code. Therefore, blind interference suppression (IS) algorithms are required to cancel the multiple access interference (MAI).

Subscriber devices, such as those compliant with the IS-95 standard, employ a rake receiver for combining multipath components, but this technique fails in the context of a highly loaded CDMA system because the rake receiver treats the interfering users as additive white Gaussian noise (AWGN) and does not attempt to suppress them. For third generation wireless systems, i.e., CDMA2000 (U.S.) and WCDMA (Europe and Asia), more robust interference mitigation techniques are required to support the higher data rates, increased capacity requirements, and service requirements.

The study of interference suppression techniques has been an active area of research for the past few years and will continue to grow for third generation wireless communications systems and beyond. Several such techniques exist, some requiring training data to adapt, others focusing on data-aided or blind minimum mean square error (MMSE) receivers, since the interfering users' codes are unknown. However, no technique exists which can estimate the interfering users' spreading codes at the subscriber device, thereby enabling powerful interference cancellation or suppression algorithms.

What is needed is a code detection technique for CDMA systems that can quickly and accurately estimate the spreading codes of other user devices in a forward link signal in order to suppress multiple access interference.

SUMMARY OF THE INVENTION

Briefly, spreading code detection methods are provided that apply autoregressive spectrum estimation (ARSE) techniques to estimate other users' codes in a code division multiple access (CDMA) signal. According to one aspect, ARSE techniques are provided using an augmented Wiener-Hopf solution on a received forward link CDMA signal. The ARSE techniques produce a power spectral density (also called a code spectrum) as a function of the full spreading code matrix and a weight vector. The spreading codes in the received forward link signal may be identified from peaks in the code spectrum.

According to another aspect, a reduced rank auto-regression (AR) implementation is provided to produce the power spectral density. The reduced rank technique greatly reduces spurious peaks in the power spectral density while simultaneously maintaining higher code detection rates.

Using either of these methods of code detection, interference cancellation can be easily performed in subscriber devices on the forward link of CDMA systems to significantly improve their performance. These techniques will have tremendous impact on the performance and capacity of future CDMA systems.

DETAILED DESCRIPTION

Figure 1:
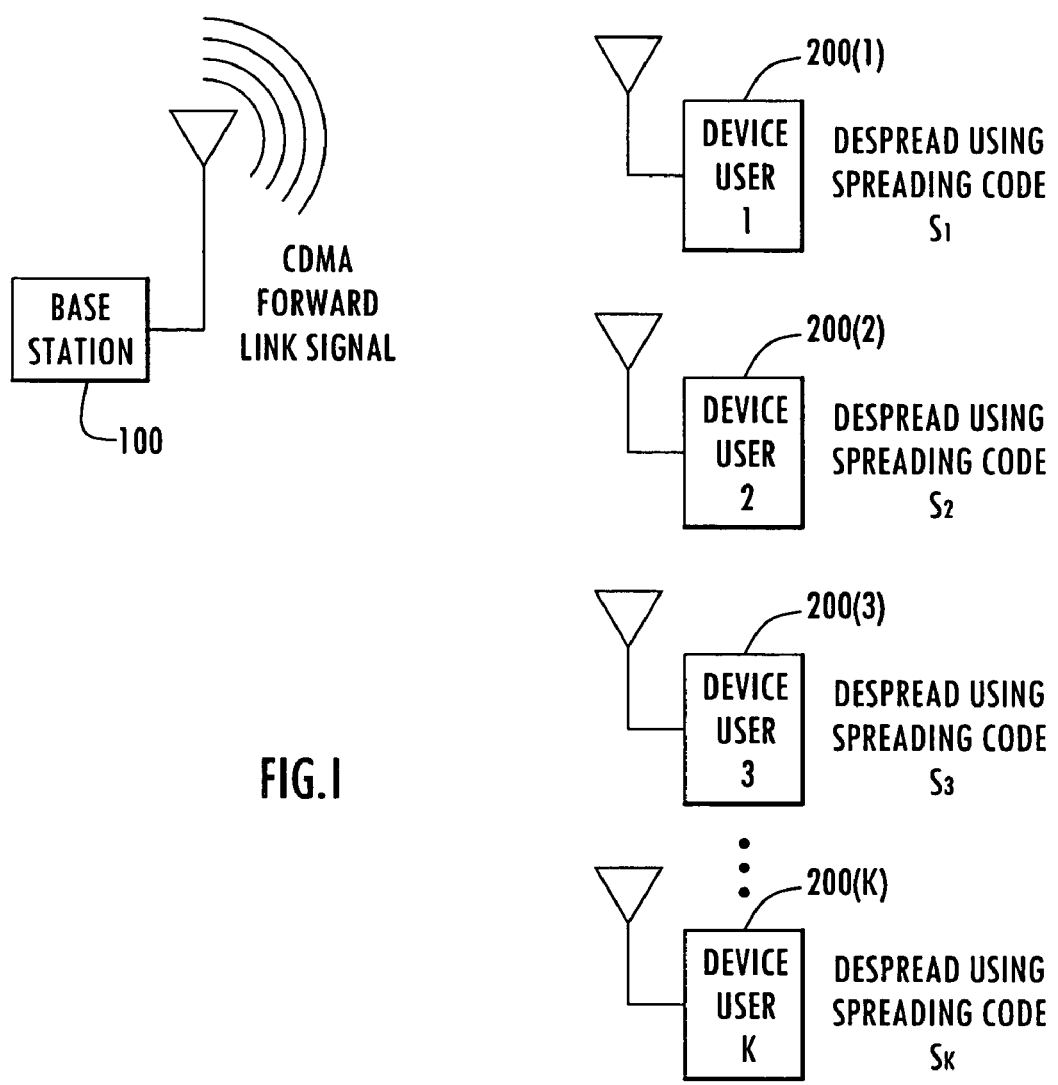
FIG. 1 is a block diagram of a system in which code division multiple access (CDMA) techniques are used between a base station and a plurality of client or subscriber devices.

Referring first to FIG. 1, a system 10 is shown in which wireless cellular communication is provided between a base station 100 and a plurality of destination client or subscriber devices 200(1) to 200(K) using code division multiple access (CDMA) techniques. The CDMA forward link signal, that is, a transmission from the base station 100 to the devices 200(1) to 200(K), is a signal that comprises multiple users' bits transmitted synchronously. Each device 200(1) to 200(K) uses its spreading code $s_1$ to $s_k$, respectively, to recover its data or bits from the forward link signal. In current and near-term future CDMA systems, the mobile user device has knowledge only of its own assigned spreading code. Consequently, blind interference suppression (IS) techniques are required to cancel multiple access interference (MAI).

In a CDMA forward link transmission, each user's bits are spread by a short Walsh-Hadamard (WH) code (i.e. a sequence of bits called chips) of length N, e.g. N=64 in IS-95. Extracting the bits for user k involves multiplying (de-spreading) the received signal with user k's spreading sequence. Assume, without loss of generality, that user one is the user of interest, e.g., device 200(1), and the sampled transmitted signal at time i is x(i) as the synchronous combination of the data bit for each user multiplied by its respective spreading sequence:

$$x(i) = A_1 b_1(i) s_1 + \sum_{k=2}^{K} A_k b_k(i) s_k. \quad (1)$$

In the above equation, $b_k(i)$ is the bit of user k at time i, $s_k$ is the N×1 spreading sequence of user k, and bits for K users are present in the forward link signal. Each device 200(1) to 200(K) has knowledge of its own spreading code. For example, device 200(1) has knowledge only of its own spreading code, $s_1$, and also does not know how many users are being transmitted in the forward link signal. As explained above, in a multipath environment, the other users' will interfere with the desired user's bit estimate.

Figure 2:
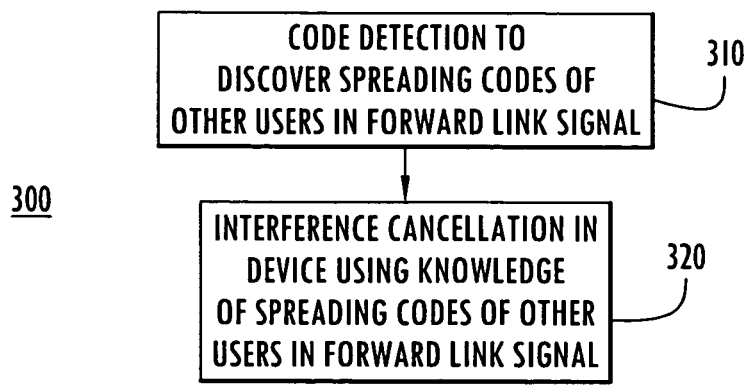
FIG. 2 is a flow chart depicting the basic steps performed using the techniques described herein for multiple access interference cancellation.

FIG. 2 shows an interference cancellation method 300 employing the concepts described herein. In step 310, code detection is performed in a device to discover the spreading codes of other devices that are being transmitted in the forward link signal. Then, in step 320, interference cancellation may be performed in a device using the knowledge of the spreading codes of other users in the forward link signal.

The code detection methodology involves auto-regressive spectrum estimation (ARSE) based on modeling a process using linear prediction to form a linear combination of the past M data values of a process to estimate the next data value at the current time i=M+1. In conventional ARSE, the value of a process at time i is formed from a linear combination of the previous M samples of the process by the augmented Wiener-Hopf equation. To introduce the ARSE concepts, the problem is defined in terms of plane waves impinging an array of antenna elements from different orthogonal angles $\theta_k$, where the goal is to determine those angles, called angles-of-arrival.

An estimate of a received process y(i) at time i is:

$$\tilde{y}(i) = -\sum_{k=1}^{M} a_M(k) y(i-k), \quad (2)$$

where $a_M(k)$, k=1, 2, ..., M are the linear coefficients to be estimated.

In matrix form, $$Y_M^H a_M = -y. \quad (3)$$

The solution is $$a_M = -R_M^{-1} r_{Y_y}; \quad (4)$$

where $$R_M = Y_M Y_M^H$$

is the correlation matrix of the process, and $r_{Y_y} = Y_M y$ is a cross-correlation vector.

The augmented Wiener-Hopf solution is obtained by manipulation of the above equation, and yields $$a_{M+1} = \| \epsilon \|^2 R_{M+1}^{-1} u_{M+1}, \quad (5)$$

where $\|\epsilon\|^2$, defined as the mean-square prediction error (MSPE), is given by $$\| \epsilon \|^2 = \sigma_y^2 + r_{Y_y}^H a_M, \quad (6)$$

and $u_{M+1}$ is a unit vector. The weight vector $a_{M+1}$ is called an auto-regression weight vector.

The conventional AR power spectral density (PSD), in terms of spatial frequencies, is written as $$P_y(\theta) = \frac{\| \epsilon \|^2}{\| G_\theta^H a_{M+1} \|^2}, \quad (7)$$

where $G_\theta = [g_{\theta 1}\ g_{\theta 2}, \ldots, g_{\theta N}]$ is a matrix of steering vectors. Each steering vector $g_{\theta k}$ is a Fourier beamforming vector that points (steers) in the direction of angle $\theta_k$. Thus, once the weight vector $a_{M+1}$ for the AR process is found, it can be used in the power spectrum equation of an AR process. The power spectral density (PSD) will contain a peak at each angle $\theta_k$ at which a signal is present, thereby allowing angle-of-arrival estimation.

The above ARSE technique is a full rank technique in that it requires inversion of a full rank correlation matrix. The multistage Wiener filter (MWF) is a reduced rank technique that provides a lower complexity realization accompanied by improved performance. The MWF is a pioneering breakthrough in that it simultaneously achieves a convergence substantially better than that achieved with other methods at a dramatically reduced computational burden as well. Matrix inversion is not required in the MWF. Another benefit of the MWF is that it can operate in low sample support operational environments where other adaptive algorithms fail. The MWF algorithm is summarized by the recursive equations in Table 1 below. Here, $y_i$ is the input received signal to be processed. The parameter D is the rank, or the number of stages, to be computed, and $h_0$ is the initial steering vector. Both D and $h_0$ are application dependent.

TABLE I

RECURSION EQUATIONS FOR THE CSA-MWF

Initialization: $d_0(i) = h_0^H y(i)$

Forward Recursion: For j = 1, 2, ..., D:

$$h_j = \frac{\sum_\Omega \{d_{j-1}^*(i) x_{j-1}(i)\}}{\left\| \sum_\Omega \{d_{j-1}^*(i) x_{j-1}(i)\} \right\|}$$

$$d_j(i) = h_j^H x_{j-1}(i)$$

$$x_j(i) = x_{j-1}(i) - h_j d_d(i)$$

TABLE I-continued

RECURSION EQUATIONS FOR THE CSA-MWF

Backward Recursion: For j = D, D – 1, ..., 1

$$e_D(i) = d_D(i)$$

$$w_j = \frac{\sum_\Omega \{d_{j-1}^*(i) e_j(i)\}}{\sum_\Omega \{|e_j(i)|^2\}}$$

$$e_{j-1}(i) = d_{j-1}(i) - w_j^* e_j(i)$$

According to a first embodiment, ARSE is applied to CDMA code detection to produce a "code spectrum transform" analogous to the Fourier transform for frequency analysis and the PSD in the case of the angle-of-arrival detection problem. The forward link signal is assumed to be synchronous in a CDMA system, with the transmitted signal described above in equation (1). The spreading codes are, for example, Walsh-Hadamard (WH) codes, as in IS-95, and the bits $b_k(i) \in (-1,+1)$ are independent. In a second embodiment, an improvement to the solution of the first embodiment is made using a reduced rank solution that is computationally more efficient and in many cases performs better.

Figure 3:
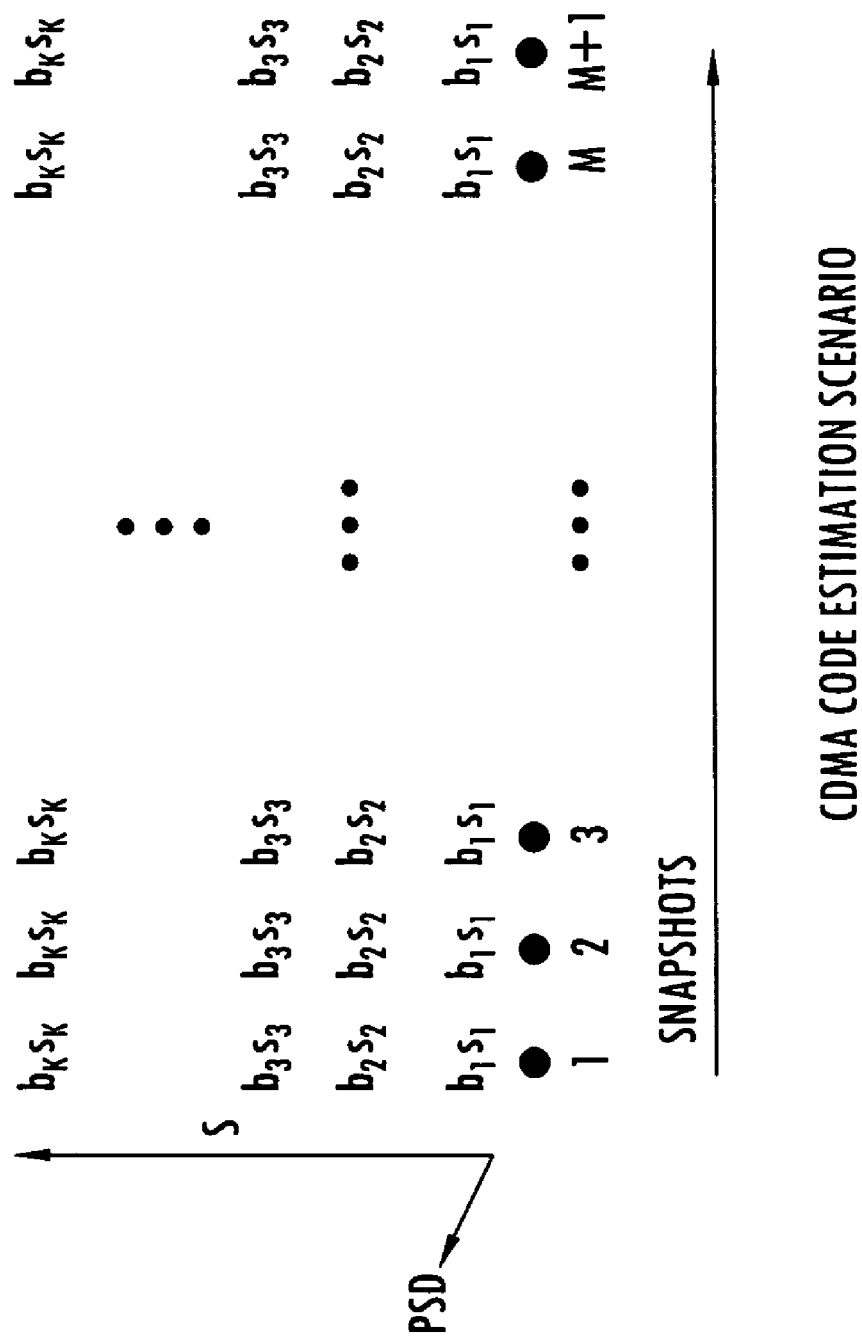
FIG. 3 is a diagram depicting the spreading code estimation process described herein.

FIG. 3 depicts the spreading code estimation scenario where the signal is received at time M+1, and the code detection techniques are applied to determine the different orthogonal users (e.g., spreading codes $s_1, s_2, s_3, \ldots, s_k$). The PSD is shown as being derived from snapshots or samples of the received signal y(i).

Figure 4:
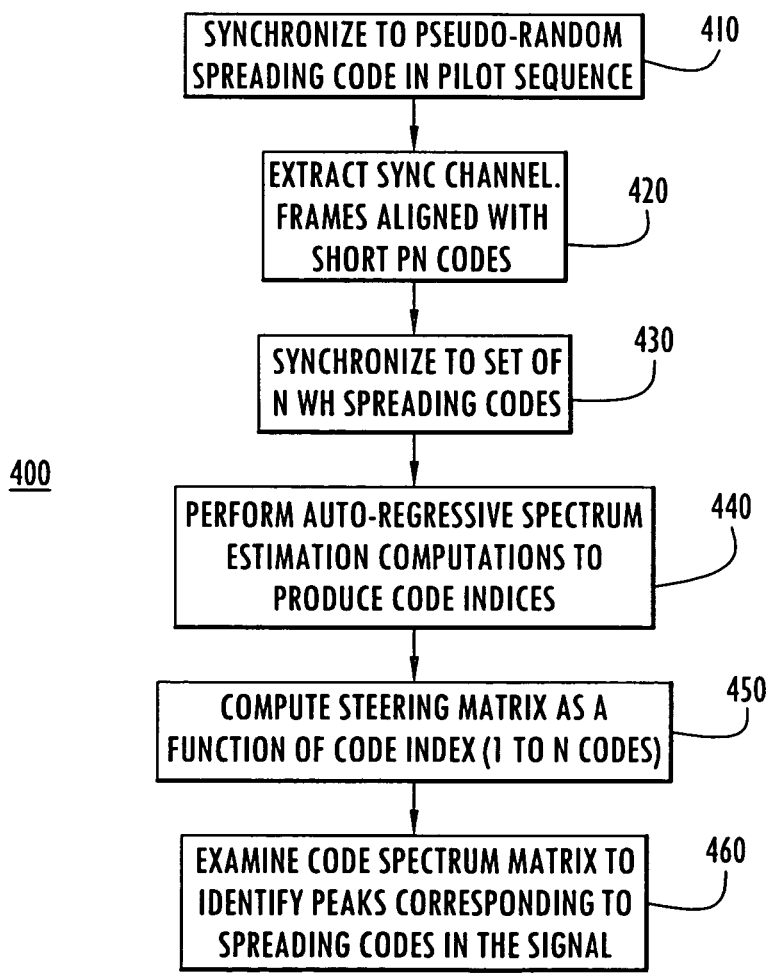
FIG. 4 is a more detailed flow chart depicting steps performed to detect the spreading codes from a received CDMA signal, applicable to implementations of first and second embodiments.

With reference to FIG. 4, a process 400 is described by which a subscriber device detects the spreading codes contained in a received forward link signal. Using IS-95 as an example, in step 410, the subscriber device first synchronizes to the short pseudo-random (PN) spreading code in the modulated signal with the aid of a pilot sequence. Numerous techniques to perform this synchronization are known in the art. Next, in step 420, the subscriber device extracts the sync channel, whose frames are aligned with the short PN codes. With the sync channel information, in step 430, the subscriber device synchronizes to the set of N=64 WH spreading codes, up to 55 of which are reserved for the traffic channel; thus, K may be as large as 55. In step 440, the ARSE computations, are performed to produce spreading code indices. In step 450, a steering matrix is computed as a function of spreading code index to produce the PSD. Finally, in step 460, the PSD versus spreading code index is examined to identify peaks. These peaks correspond to spreading code indices of all users in the forward link signal. The computations depicted by steps 440-460 are described in greater detail below.

Assuming that the signal given in equation (1) is distorted by a fading, multipath channel, as is typical of terrestrial CDMA systems, the received signal is:

$$y(i) = \hat{x}(i) + n(i), \quad (8)$$

where $\hat{x}(i) = x(i) * h$, $h = [h_1, h_2, \ldots, h_L]$ is the vector of channel coefficients, L is the delay spread of the channel, n(i) are AWGN samples, and * denotes convolution. The ^ symbol is used to denote convolution of the operator with the channel vector h. Thus, the received signal can be expressed as $$y(i) = A_1 b_1(i) \hat{s}_1 + \sum_{k=2}^{K} A_k b_k(i) \hat{s}_k + n(i); \quad (9)$$

The channel vector h is usually estimated with the pilot sequence, and for this application, it is assumed known.

The goal is to optimally detect the bits transmitted by user one, $b_1(i)$, by canceling the interference induced by the other K–1 users, represented by the term in the above summation. However, the spreading codes of the interfering users are typically unknown to the subscriber device and therefore blind interference suppression techniques are normally used.

Full Rank Code Spectrum Estimation

The ARSE technique is adapted to the CDMA problem. Recall that in conventional ARSE, the value of a process at time i is formed from a linear combination of the previous M samples of the process. This is the value of a linearly spaced array at element M+1, where the problem is defined in terms of plane waves impinging the array from different orthogonal angles, and the goal is to determine those angles. In the CDMA context, the signal is received at time M+1, and the goal is to determine the different orthogonal users that are present. Assume that M samples of the process are collected to form a set of snapshots. In multipath, $Y_M$ is an (N+L–1)×M matrix whose columns contain the (N+L–1)×1 spreading code chips multiplied with the bit at each time instance i, and whose rows contain M bits of data starting at time i. It is implicitly assumed that the codes do not change within the block of M bits, so M may be small. Furthermore, the weight vector $a_M$ and the received signal y are (N+L–1)×1 and M×1 vectors, respectively. $R_{M+1}$ is an (N+L–1)×(N+L–1) correlation matrix, and $u_{M+1}$ is an (N+L–1)×1 unit vector.

The vector y is the sample of the process, at time i, to be estimated from the previous M samples. For the CDMA problem, spatial frequencies $\theta_k$ are replaced by codes. Specifically, each $g_{\theta k}$ in equation (7) is replaced by $s_k$, thereby mapping the angle space to code space. Comparing equation (2) to equation (9), it is seen that the bits $b_k$ can be absorbed in the coefficient $a_M$, so that the estimate of the process contains only the spreading codes $s_k$ as desired. More specifically, the channel matched spreading codes are used after the channel is estimated with a pilot, so that $\hat{s}_k$ of dimension N+L–1, is used. The steering matrix becomes a function of spreading codes $$G_\theta \Rightarrow \hat{S}_N = [\hat{s}_1\, \hat{s}_2 \ldots \hat{s}_N], \quad (10)$$

This steering matrix includes all of the N codes present in the set (i.e., the full spreading code matrix). It is not known, but to be determined, which K codes (users) are present in the correlation matrix. The PSD, or "code spectrum", as a function of code index from 1 to N is computed as $$P_y(N) = \frac{\|\epsilon\|^2}{\|\hat{S}_N^H a_{M+1}\|^2}, \quad (11)$$

According to the first embodiment, the spreading codes $\hat{s}_k$, which are the columns of the full spreading code matrix $\hat{S}_N$, are derived by computing the weight vector $a_{M+1}$ using the Wiener-Hopf equation, equation (5) for a full-rank ARSE solution. That is, the weight vector $a_{M+1} = \|\epsilon\|^2 (R_{M+1})^{-1} u_{M+1}$ is computed from samples of the received signal over time. Next, the power spectral density function $P_y(N)$ is computed according to equation 11 as a function of the full spreading code matrix and the weight vector. The peaks in the PSD as a function of spreading code index reveal the spreading codes of destination devices present in the received signal.

Figure 5:
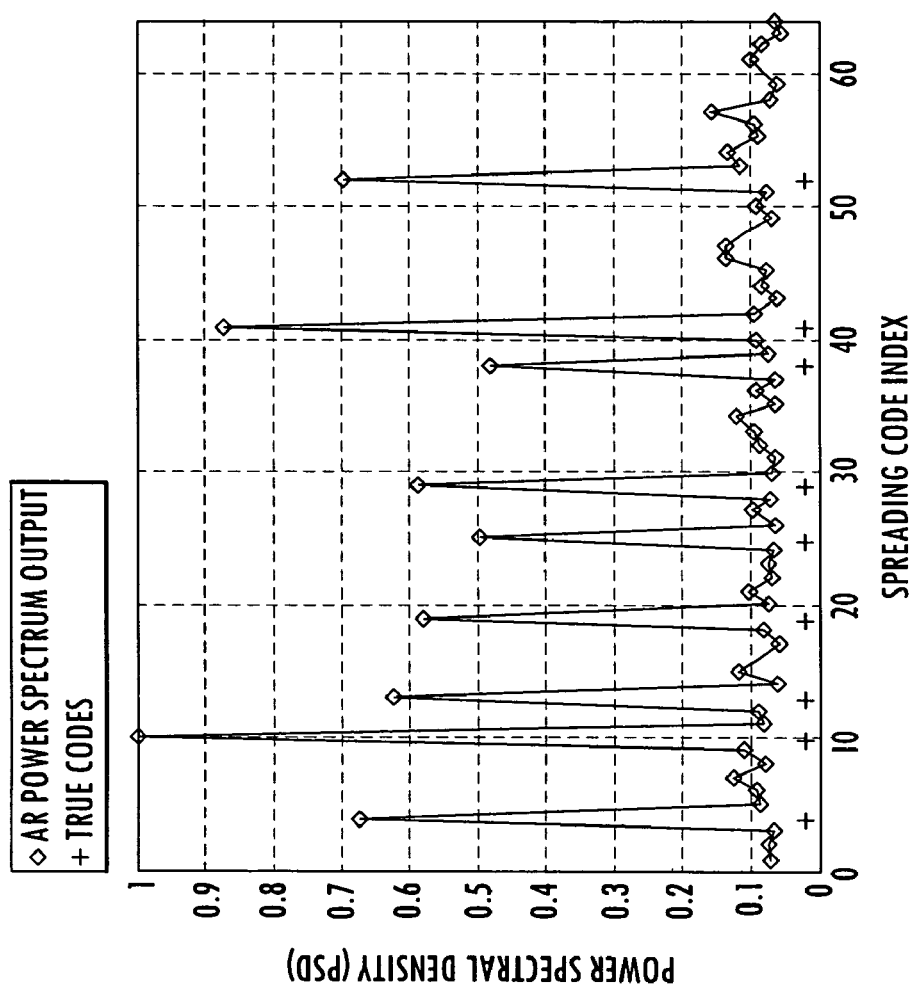
FIG. 5 is a plot of power spectral density versus code spreading index for the code detection technique according to a first embodiment.

FIG. 5 illustrates a numerical example to show the performance of the ARSE algorithm as applied to the CDMA problem. FIG. 5 shows a PSD versus spreading code plot for an example where, N=64 (WH codes as in the IS-95 forward link), $E_b/N_0$=5 dB, K=9 randomly chosen users, M=1000 bits, and an L=1 tap channel are used. The algorithm can correctly identify all 9 codes present in the signal. A detection may be said to occur if the PSD exceeds a threshold, set equal to three times the noise floor, for example. Probability of false alarm ($P_{FA}$) remains fairly constant as a function of $E_b/N_0$ and can be made arbitrarily low by choosing large enough $E_b/N_0$ or M. Performance is nearly the same as the number of users, K, changes, and converges faster for larger K.

This ARSE CDMA code detection technique provides a code spectrum analogous to the well-known Fourier transform that produces a frequency spectrum. Codes are orthogonal, as are frequencies, thus the concept of a Fourier transform is extended to the code domain. The subscriber device on the forward link gains knowledge of the codes of all the users in the forward link signal and can therefore perform interference cancellation. Many efficient and powerful algorithms exist to perform interference cancellation and the performance gain of such techniques using the code estimation techniques described herein are at least two orders of magnitude better.

This algorithm does not require knowledge of the long code present in most CDMA systems. This long code is difficult to synchronize to without prior knowledge. Since the long code is decimated to the bit rate, its presence does not affect code detection as it can also be absorbed into the linear coefficients like the bits.

Rank Reduction Using the MWF

The ARSE code estimation technique of the first embodiment requires a computationally intense full rank matrix inversion. According to a second embodiment, the ARSE solution is implemented in an efficient reduced rank form. For the CDMA problem, the MWF implements the optimal full rank minimum mean square error (MMSE) solution in reduced rank form. The MMSE solution to do bit detection for CDMA is given by $$c_{MMSE}=R^{-1}h_0, \quad (12)$$

where R is the correlation matrix of the received signal, and $h_0=s_1$, is the spreading code of a desired user, i.e., the spreading code assigned to the device that is implementing the algorithm to detect other users' codes. The MWF gives the MMSE solution by setting $h_0=s_1$. Comparing equation (5) and equation (12), it is seen that the ARSE solution for CDMA can be implemented using the MWF by setting $h_0=u_{M+1}$, which is the unit vector of length M+1, and evaluating the MWF recursion equations provided above in Table 1 to solve for the weight vector $a_{M+1}$. Then, the PSD $P_y(N)$ is computed from the weight vector.

Figure 6:
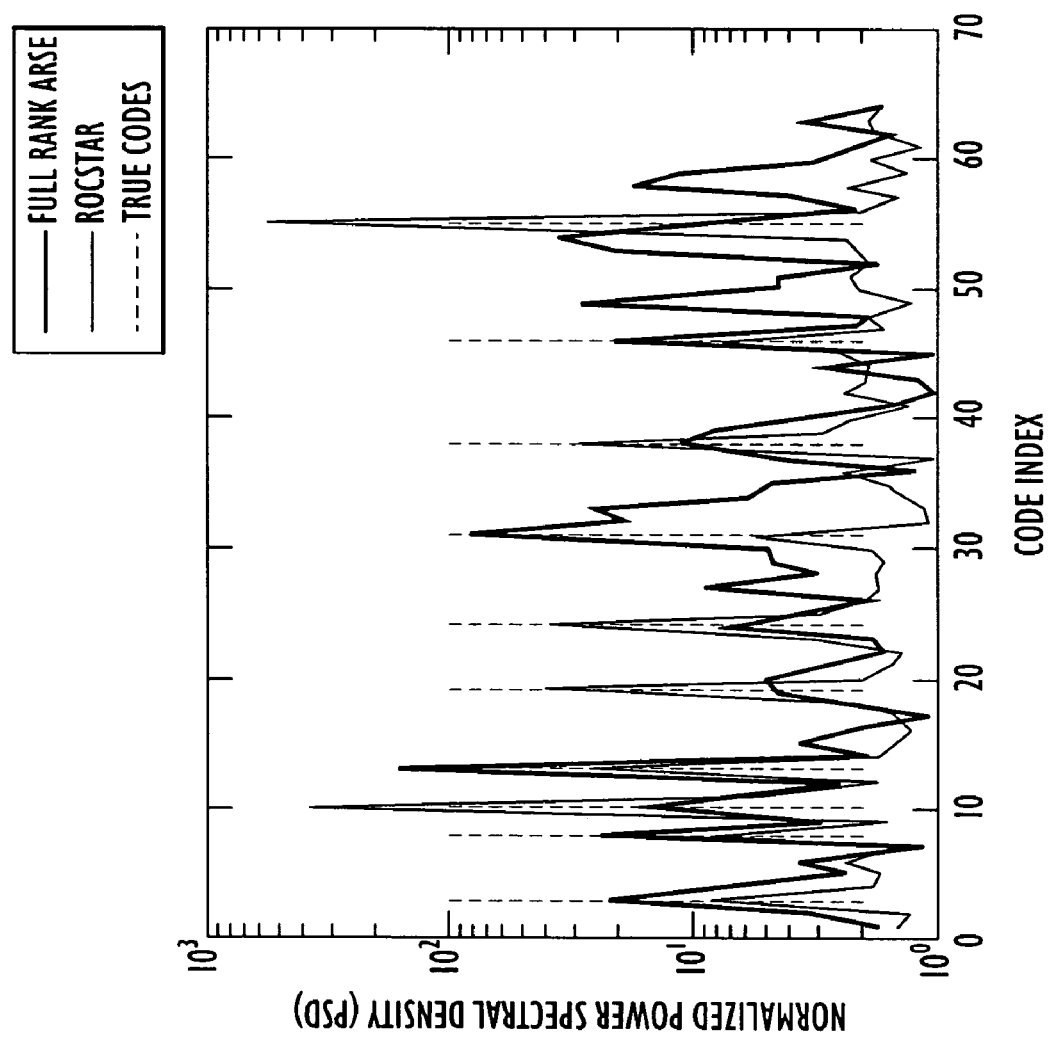
FIG. 6 are plots showing comparison of the power spectral density versus code spreading index for the code detection techniques according to the first and second embodiments.

FIG. 6 shows a comparison of the PSD vs. spreading code index plots for the full rank and reduced rank solutions. In FIG. 6, N=64 (WH codes as in the IS-95 forward link), $E_b/N_0$=5 dB, K=10 randomly chosen users, M=2Nbits, and an L=5 tap Rayleigh fading multipath channel are used. For the reduced rank solution the rank is 2. In this example, a detection results if the PSD exceeds a threshold, set equal to twice the noise floor. It is seen that the reduced rank solution can correctly identify all 10 codes present in the signal while minimizing the number of spurious peaks versus the full rank technique. In the presence of multipath, the rank of the MWF algorithm set at two is sufficient. In white noise, a rank one algorithm is sufficient and fast. This is a powerful advantage of this reduced rank algorithm, because the number of users is unknown. Other reduced rank algorithms, such as principal components, require knowledge of the number of users in the system to provide adequate performance in a reduced rank subspace.

The advantages of the reduced rank algorithm are as follows. Covariance matrix inversion is not required, and therefore the algorithm is very efficient. The algorithm can converge with minimal sample support M, which as stated earlier, is highly desirable as codes may change over time. It achieves significant improvements in the false alarm rate (FAR) for code detection by eliminating spurious peaks in the spectrum that result from a reduction in the noise. The rank of the algorithm, i.e. D, does not depend on the number of users, which is generally unknown, and can be fixed at a low number. Finally, the algorithm is robust in the presence of interference.

The method for detecting spreading codes according to the first and second embodiments may be summarized as follows: receiving a signal transmitted using code division multiple access techniques in which bits for each of a plurality of destination devices are spread with a corresponding spreading code; computing a weight vector using auto-regressive techniques from samples of the received signal over time; computing a power spectral density as a function of the full spreading code matrix, and the weight vector; and identifying a peak in the power spectral density, wherein a peak corresponds to a spreading code associated with bits for another destination device present in the received signal.

Figure 7:
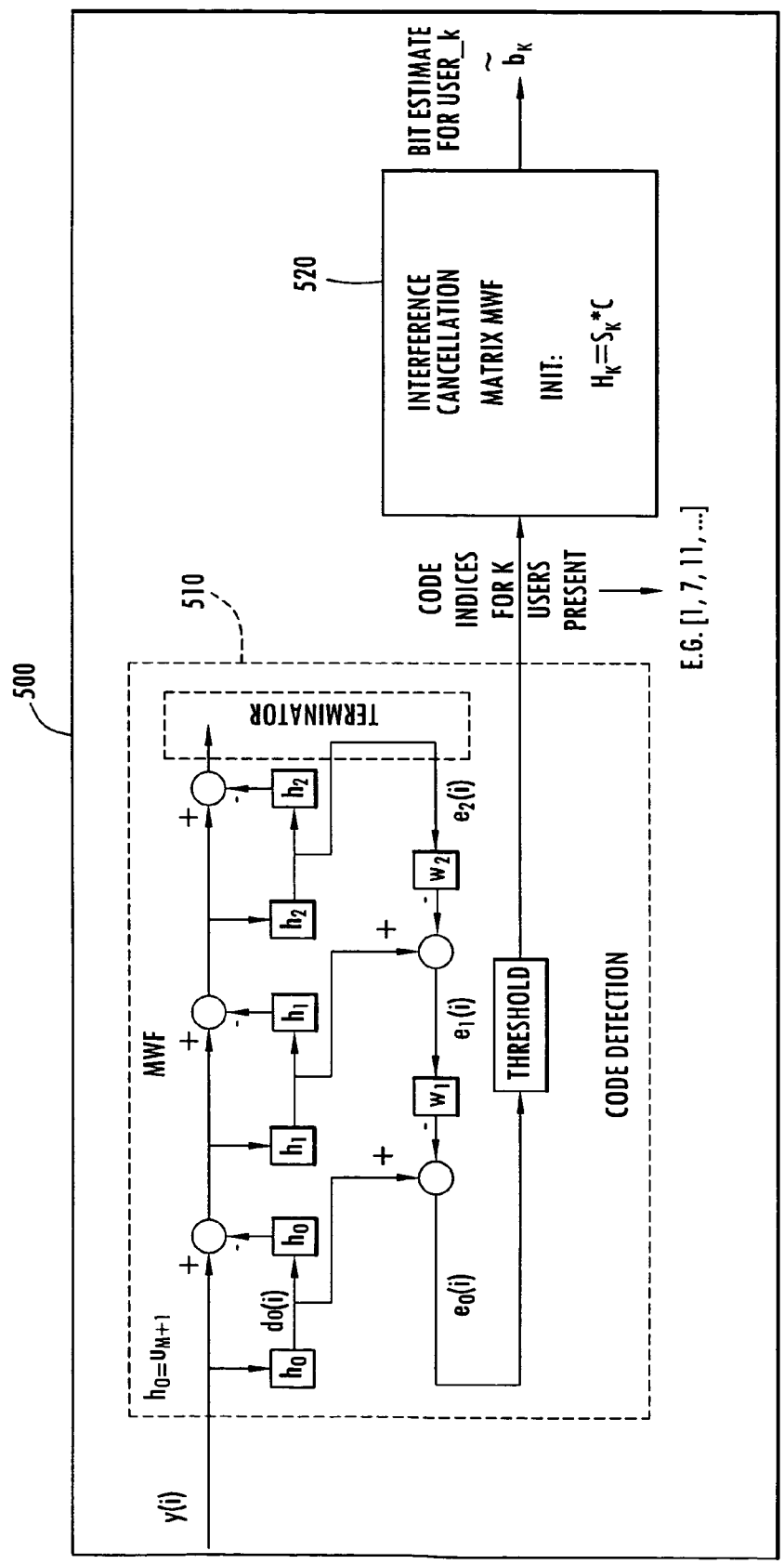
FIG. 7 is a block diagram of a portion of a CDMA receiver depicting the computations performed to detect the spreading codes according to the second embodiment.

FIG. 7 illustrates a portion of a baseband signal processor 500 (e.g., modem) in a device 200 that performs the MWF implementation. As is known in the art, the baseband signal processor 500 may be implemented as an application specific integrated circuit comprised of digital logic gates configured to perform the desired functionality. Alternatively, the baseband signal processor 500 may be a microprocessor accompanied by instructions stored on a processor readable medium that, when executed by the microprocessor, cause the microprocessor to perform the baseband signal processing functions. Block 510 performs code detection using a correlation subtraction architecture of an MWF according to the techniques of the second embodiment and the equations set forth above in Table 1. The outputs of the block 510 are the code indices for the K users present in the forward link signal, and this information is coupled to an interference cancellation block 520. The interference cancellation block 520 performs one of many known interference cancellation techniques to extract the bit estimate for user k, which may be done by using a matrix form of the MWF, where $h_0$ is replaced by $H_K$.

Figure 8:
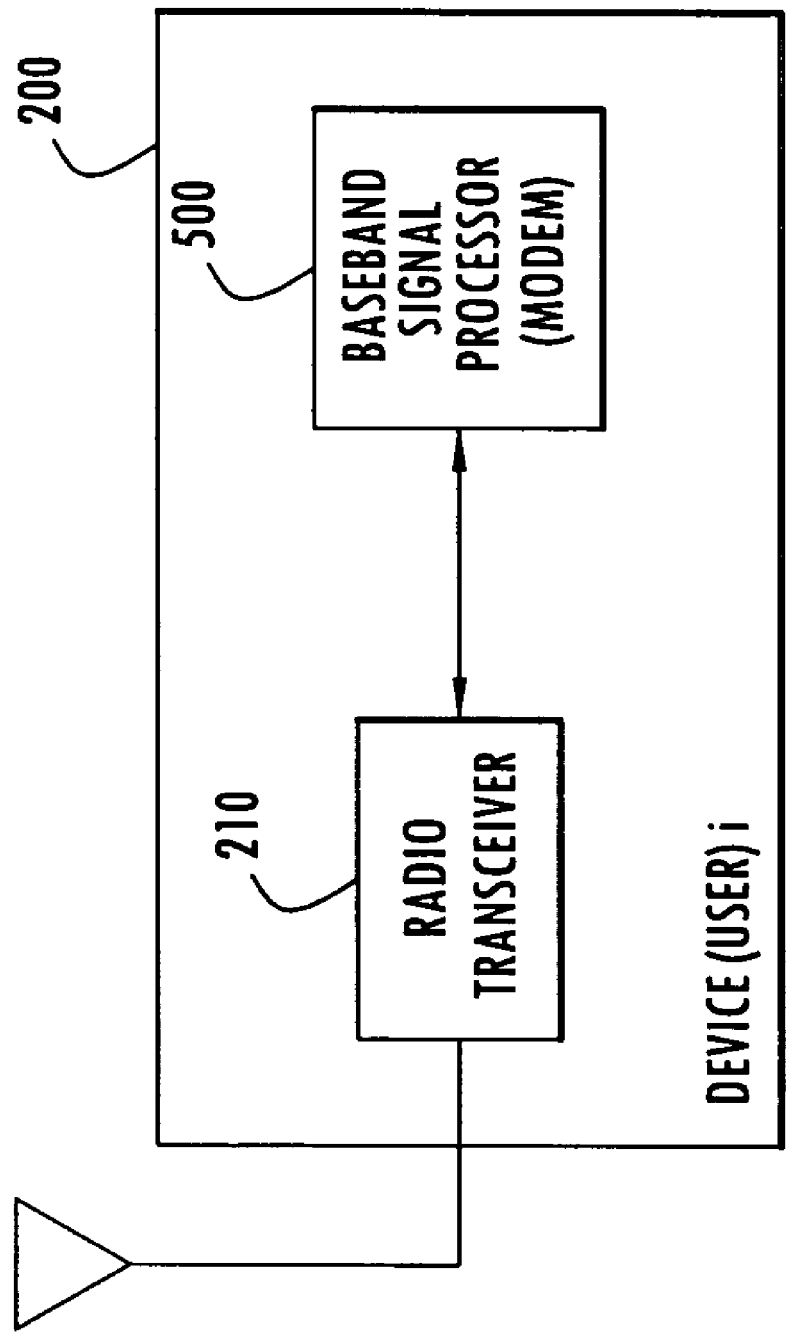
FIG. 8 is a block diagram of a radio device in which the techniques described herein may be performed.

FIG. 8 illustrates a block diagram of a CDMA subscriber device 200. The device 200 comprises a radio transceiver 210 that performs radio reception and radio transmission of CDMA signals, and a baseband signal processor or modem 500 that performs the baseband signal processing associated with CDMA standard signaling protocols. The code detection and interference cancellation techniques described and referred to herein are performed by the baseband signal processor 500.

To summarize, a method is provided for detecting spreading codes from a signal transmitted using code division multiple access techniques, comprising: receiving a signal transmitted using code division multiple access techniques in which bits for each of a plurality of destination devices are spread with a corresponding spreading code; computing a power spectral density as a function of the full spreading code matrix from samples of the received signal over time; and identifying from the power spectral density one or more spreading codes associated with bits for destination devices present in the received signal.

Similarly, a receiver device is provided comprising a radio receiver that receives wireless radio signals and produces a baseband signal therefrom; a baseband signal processor coupled to the radio receiver, wherein the baseband signal processor: computes a power spectral density as a function of the full spreading code matrix from samples of a received signal over time; and identifies from the power spectral density one or more spreading codes associated with bits for destination devices present in the received signal.

The system and methods described herein may be embodied in other specific forms without departing from the spirit or essential characteristics thereof. The foregoing embodiments are therefore to be considered in all respects illustrative and not meant to be limiting.

The invention claimed is:

1. A method in a communication device for estimating spreading codes for other destination devices which are present in a signal that has been transmitted using code division multiple access techniques, and wherein the communication device has knowledge only of its own spreading code, comprising:
   a. receiving said signal at said communication device and generating samples thereof;
   b. computing a weight vector using auto-regression techniques based on samples of the received signal over time, and computing a power spectral density from the weight vector as a function of the full spreading code matrix to determine correlations among spreading codes used for bits present in the received signal, wherein computing the weight vector comprises computing $a_{M+1} = \|\epsilon\|^2 (R_{M+1})^{-1} u_{M+1}$, where $R_{M+1}$ is a correlation matrix $Y_{M+1}(Y_{M+1})^H$, $Y_{M+1}$ is a matrix representing the received signal at time M+1, $u_{M+1}$ is a unit vector and $\|\epsilon\|^2$ is a mean-square prediction error; and
   c. identifying from a peak in the power spectral density a spreading code associated with bits present in the received signal for another destination device.

2. The method of claim 1, wherein (b) computing comprises computing from the weight vector the power spectral density $$P_y(N) = \frac{\|\epsilon\|^2}{\left\|\hat{S}_N^H a_{M+1}\right\|^2},$$

where $S_N = [\hat{S}_1 \hat{S}_2 \ldots \hat{S}_N]$ represents a steering matrix for all spreading codes in a set, those spreading codes in the set which are present in the received signal being indicated by a peak in the power spectral density Py(N).

3. The method of claim 2, wherein (c) identifying comprises identifying from a peak in the power spectral density a spreading code associated with bits for another destination device present in the received signal.

4. The method of claim 1, wherein (b) computing comprises computing the weight vector using auto-regression techniques in a reduced rank form with a multistage Wiener filter.

5. The method of claim 4, wherein (b) computing comprises computing the weight vector using multistage Wiener filter recursive equations according to a minimum mean square error (MMSE) solution $c_{MMSE} = R^{-1} h_0$, where $h_0$ is a spreading code assigned to a device at which the signal is received, R is a correlation matrix $YY^H$, and Y is a matrix representing the received signal.

6. A method for canceling interference in a signal transmitted using code division multiple access techniques comprising the method of claim 1, and further comprising canceling interference with respect to bits for other destination devices in the received signal using the one or more spreading codes associated with other destination devices.

7. A device comprising:
   a. a radio receiver that receives a wireless radio that has been transmitted using code division multiple access techniques and produces a baseband signal therefrom;
   b. a baseband signal processor coupled to the radio receiver, wherein the baseband signal processor:
      i. computes a weight vector $a_{M+1}$ using auto-regression techniques from samples of the received signal over time, where $a_{M+1} = \|\epsilon\|^2 (R_{M+1})^{-1} u_{M+1}$, $R_{M+1}$ is a correlation matrix $Y_{M+1}(Y_{M+1})^H$, $Y_{M+1}$ is a matrix representing the received signal at time M+1, $u_{M+1}$ is a unit vector and $\|\epsilon\|^2$ is a mean-square prediction error, and computes a power spectral density as a function of the full spreading code matrix from the weight vector to determine correlations among spreading codes used for bits in the received signal; and
      ii. identifies from a peak in the power spectral density a spreading code associated with bits present in the received signal for another destination device.

8. The receiver device of claim 7, wherein the baseband signal processor computes the power spectral density $$P_y(N) = \frac{\|\epsilon\|^2}{\left\|\hat{S}_N^H a_{M+1}\right\|^2},$$

where $S_N = [\hat{S}_1 \hat{S}_2 \ldots \hat{S}_N]$ represents a steering matrix for all spreading codes in a set, those spreading codes in the set which are present in the received signal being indicated by a peak in the power spectral density Py(N).

9. The receiver device of claim 8, wherein the baseband signal processor identifies spreading codes by identifying a peak in the power spectral density, wherein a peak corresponds to a spreading code associated with bits for another destination device present in the received signal.

10. The receiver device of claim 7, wherein the baseband signal processor computes the weight vector using auto-regression techniques in a reduced rank form with a multistage Wiener filter.

11. The receiver device of claim 10, wherein the baseband signal processor computes the weight vector using multistage Wiener filter recursive equations according to a minimum mean square error (MMSE) solution $c_{MMSE} = R^{-1} h_0$, where $h_0$ is a spreading code assigned to a device at which the signal is received, R is a correlation matrix $YY^H$, and Y is a matrix representing the received signal.

12. The receiver device of claim 7, wherein the baseband signal processor cancels interference with respect to bits for other destination devices in the received signal using the one or more spreading codes associated with other destination devices.

13. A method in a communication device for estimating spreading codes for other destination devices which are present in a signal that has been transmitted using code division multiple access techniques, and wherein the communication device has knowledge only of its own spreading code, comprising:

a. receiving said signal at said communication device and generating samples thereof;

b. computing a weight vector $a_{M+1}$ using auto-regression techniques from samples of the received signal over time, where $a_{M+1} = \|\epsilon\|^2 (R_{M+1})^{-1} u_{M+1}$, $R_{M+1}$ is a correlation matrix $Y_{M+1}(Y_{M+1})^H$, $Y_{M+1}$ is a matrix representing the received signal at time M+1, $u_{M+1}$ is a unit vector and $\|\epsilon\|^2$ is a mean-square prediction error;

c. computing a power spectral density as a function of the full spreading code matrix based on the weight vector to determine correlations among spreading codes used for bits in the received signal; and d. identifying from a peak in the power spectral density a spreading code associated with bits for another destination device present in the received signal.

14. The method of claim 13, wherein (c) computing comprises computing the power spectral density $$P_y(N) = \frac{\|\epsilon\|^2}{\|\hat{S}_N^H a_{M+1}\|^2},$$

where $S_N = [\hat{S}_1 \ \hat{S}_2 \ldots \hat{S}_N]$ represents a steering matrix for all spreading codes in a set, those spreading codes in the set which are present in the received signal being indicated by a peak in the power spectral density Py(N).

15. The method of claim 13, wherein (b) computing comprises computing the weight vector using multistage Wiener filter recursive equations according to a minimum mean square error (MMSE) solution $c_{MMSE} = R^{-1} h_0$, where $h_0$ is a spreading code assigned to a device at which the signal is received, R is a correlation matrix $Y(Y)^H$, and Y is a matrix representing the received signal.

16. The method of claim 13, wherein (c) computing comprises computing the power spectral density $$P_y(N) = \frac{\|\epsilon\|^2}{\|\hat{S}_N^H a_{M+1}\|^2},$$

where $S_N = [\hat{S}_1 \ \hat{S}_2 \ldots \hat{S}_N]$ represents a steering matrix for all spreading codes in a set, those spreading codes in the set which are present in the received signal being indicated by a peak in the power spectral density Py(N).

17. The method of claim 13, wherein (b) computing comprises computing the weight vector using multistage Wiener filter recursive equations according to a minimum mean square error (MMSE) solution $c_{MMSE} = R^{-1} h_0$, where $h_0$ is a spreading code assigned to a device at which the signal is received, R is a correlation matrix $Y(Y)^H$, and Y is a matrix representing the received signal.

18. A method for canceling interference in a signal transmitted using code division multiple access techniques comprising the method of claim 13, and further comprising canceling interference with respect to bits for other destination devices in the received signal using the one or more spreading codes associated with other destination devices.

19. The method of claim 13, wherein (b) computing comprises computing the weight vector using auto-regression techniques in a reduced rank form with a multistage Wiener filter.

* * * * *